Figure 1:
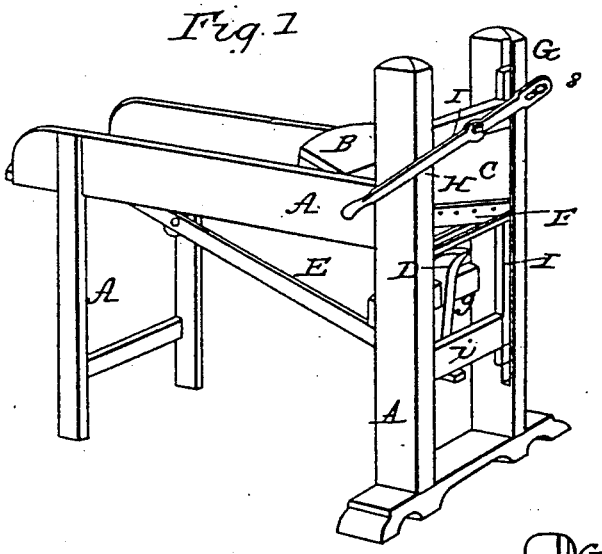
Figure 2:
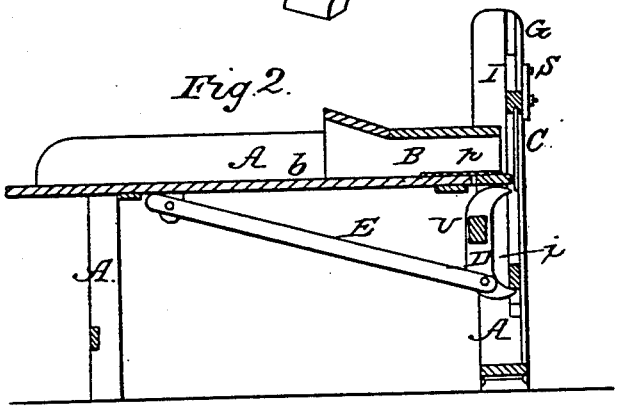

W. W. HOLLMAN.

Straw Cutter.

No. 258. A. I. Patented Nov. 29, 1859.

N. PETERS, Photo-Lithographer, Washington, D. C.